United States Patent [19]

Pike et al.

[11] Patent Number: 4,888,079

[45] Date of Patent: Dec. 19, 1989

[54] METHOD FOR BONDING JOINTS WITH AN ORGANIC ADHESIVE USING A WATER SOLUBLE AMORPHOUS HYDRATED METAL OXIDE PRIMER

[75] Inventors: Roscoe A. Pike, Granby; Gerald S. Golden, Windsor, both of Conn.

[73] Assignee: United Technologies Corporation, Hartford, Conn.

[21] Appl. No.: 110,989

[22] Filed: Oct. 21, 1987

[51] Int. Cl.[4] ................................................ C09J 5/04
[52] U.S. Cl. .................................. 156/319; 252/313.1; 428/469; 428/472
[58] Field of Search ................ 156/319; 423/111, 626; 428/469, 472; 252/313.1

[56] References Cited

U.S. PATENT DOCUMENTS

| | | | |
|---|---|---|---|
| 2,820,693 | 1/1958 | Hervert et al. | 252/313.1 |
| 2,943,955 | 7/1960 | Brill | 117/121 |
| 2,984,628 | 5/1961 | Alexander et al. | 252/313.1 |
| 3,002,854 | 10/1961 | Brill | 117/121 |
| 3,017,282 | 1/1962 | Brill | 106/287 |
| 3,547,670 | 12/1970 | Fuchs et al. | 106/286 |
| 3,657,003 | 4/1972 | Kenney | 252/313.1 |
| 3,861,978 | 1/1975 | Connole et al. | 156/319 |
| 3,989,876 | 11/1976 | Moji et al. | 428/472 |
| 4,010,247 | 3/1977 | Wassermann et al. | 423/626 |
| 4,584,108 | 4/1986 | Block | 252/8.5 B |
| 4,623,591 | 11/1986 | Pike | 428/414 |

FOREIGN PATENT DOCUMENTS 654049  6/1951  United Kingdom .

OTHER PUBLICATIONS

Arthur W. Thomas, "The Nature of 'Aluminum Oxide' Hydrosols", The Journal of the American Chemical Society, Mar. 5, 1932, pp. 841–855.

Primary Examiner—John J. Gallagher

[57] ABSTRACT

A method of bonding a plurality of articles together with an organic adhesive by using a primer that provides increased crack propogation resistance without the use of organic solvents. The method comprises reacting aluminum, titanium, silicon, iron, or zirconium with HBr or HCl. The reaction product is oxidized with a water soluble oxidizing agent to form a hydrosol. The hydrosol is applied to the surface of a metal article prior to the application of adhesive.

3 Claims, 2 Drawing Sheets

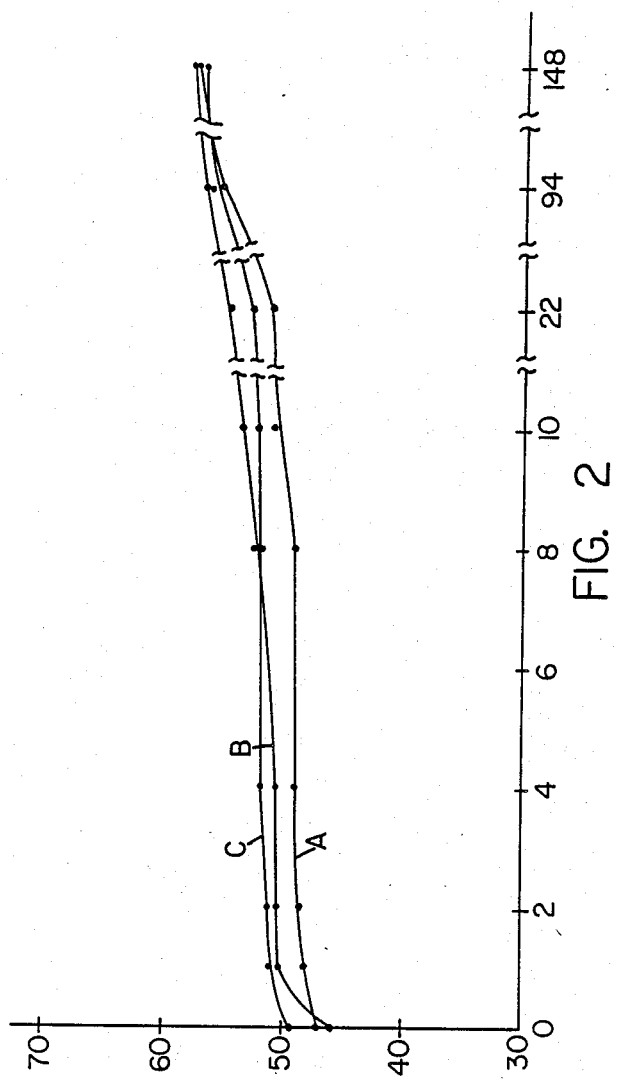

METHOD FOR BONDING JOINTS WITH AN ORGANIC ADHESIVE USING A WATER SOLUBLE AMORPHOUS HYDRATED METAL OXIDE PRIMER

DESCRIPTION

1. Technical Field

The field of art to which this invention pertains is methods for adhesively bonding joints.

2. Background Art

Weight saving and manufacturing cost benefits have led to the increase in use of adhesively bonded structures in the aircraft and aerospace industries. In order to be a viable alternative to, for example, metal fasteners, these adhesive bonds should maintain the strength typical of conventional fastener systems. In many applications the bonds are put under a variety of environmental and mechanical stresses. For example, frequently these bonds are exposed over long periods of time to wet environments which can result in a loss of bond strength. The loss of strength can result from the extension of cracks and other deformations that occur in the adhesive and which are exacerbated by the moist environment. As a result of this deficiency, extensive research and development efforts have been undertaken to define methods and identify materials which improve bonded joint performance in humid conditions. For example, it is known that surface preparation is important in the bonding of aluminum and titanium. Thus it is essential that before bonding, the adherend is cleaned and chemically pretreated to produce a surface which combines with the adhesive to develop the bond strengths which meet application requirements. A variety of pretreatments for aluminum have been developed to produce improved bondability. These include acid etching (FPL), and anodized treatments with sulfuric (SA), chromic (CAA) and phosphoric acid (PAA). The latter, PAA, is generally accepted as the most effective surface treatment in terms of bond strength and durability at the present time. It has been shown by in depth surface analysis using scanning transmission electron microscopy that the PAA treatment produces fine oxide protrusions of greater length and magnitude than other surface treatments. These whiskers are believed to account for the strength enhancement achieved with joints made using PAA treated adherends. Thus, mechanical interlocking by whisker reinforcement of an adhesive appear to play a role in enhancing adhesive bonding. The probability that chemical interaction is of major importance, depending upon the polymer/metal combination, is also believed.

Commonly assigned U.S. Pat. No. 4,623,591 describes an amorphous hydrated metal oxide primer for adhesively bonded articles that results in a bond resistant to crack propagation. A metal article has a layer of amorphous hydrated metal oxide formed by applying and subsequent hydrolysis of a layer of $M_xOR_y$. In the formula $M_xOR_y$, x is 1, y is 3 or 4, M is any metal capable of forming a stable alkoxide and R is an organic radical. The bonded joint is preferably made by applying to a surface of a metal article a layer of the above-described metal alkoxide. The metal article is exposed to moisture and a temperature from about 25° C., to about 125° C., and adhesive is placed in contact with and between the articles to be bonded. The bonded articles are then exposed to pressure and optional heat resulting in a joint resistant to crack propagation. However, these inorganic primers are generated by application of an organic solution of a metal alkoxide to the substrate. Because of increased environmental considerations, a thrust of current adhesive technology is to eliminate the use of organic solvents. Thus, although the above surface preparations have provided advantages, there is a need for environmentally safe technology to aid in the advancement of lightweight aerospace-type metal structures.

Accordingly, there is a constant search in this field of art for new methods of providing lightweight, structurally sound, adhesively bonded metal joints.

DISCLOSURE OF INVENTION

This invention is directed toward a method of bonding a plurality of articles together with an organic adhesive by using a primer that provides increased crack propogation resistance without the use of organic solvents. The method comprises reacting aluminum, titanium, silicon, iron, or zirconium with HBr or HI. The reaction product is oxidized with a water soluble oxidizing agent to form a hydrosol. The hydrosol is applied to the surface of a metal article prior to the application of adhesive.

This amorphous metal oxide primer for adhesively bonded joints provides bonds that have equal or greater resistance to crack propagation than those made with organic primers. Thus, this invention makes a significant advance to the aerospace industry by providing new technology relating to adhesive bonding.

Other features and advantages will be apparent from the specification and claims and from the accompanying drawings which illustrate an embodiment of the invention

BRIEF DESCRIPTION OF DRAWINGS

FIG. 2 illustrates the crack propagation for vacuum-dried amorphous hydrated metal oxide primed aluminum aluminum adherend adhesive bonds having 2-4 coatings of the primer.

BEST MODE FOR CARRYING OUT THE INVENTION

Figure 1:
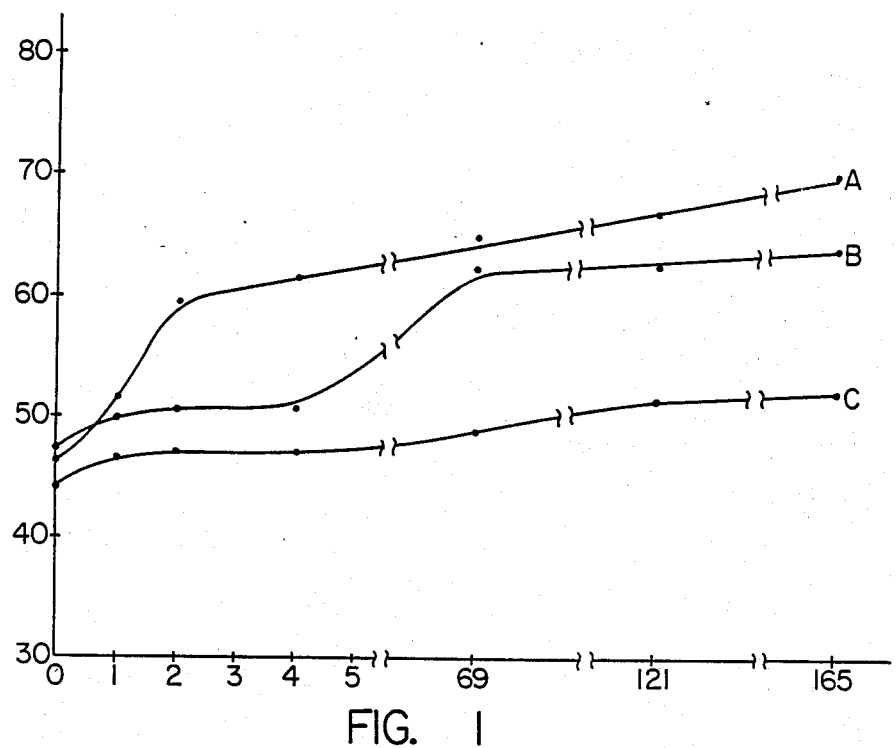
FIG. 1 illustrates the crack propagation for air-dried amorphous hydrated metal oxide primed aluminum adherend adhesive bonds having 1-3 coatings of the primer.

Aluminum is preferred as the metal for the water soluble amorphous hydrated metal oxide primers of this invention. However it is believed that Ti, Si, Fe, Zr and other hydrosol forming metals or combinations thereof may also be used.

Any acid HX may be used that results in a metal salt which undergoes oxidation to produce a metal-OH bond. Typically, X may be Br or I. Cl is not preferred since the chlorine is not oxidized during the oxidation step described below.

Typically, any oxidizing agent can be used that is water soluble. Exemplary oxidizing agents are $H_2O_2$, $O_3$, organohydroperoxides (e.g. t-butyl hydro peroxide) and ozonides.

Typically, the amorphous hydrated metal oxide primers of this invention are made by reacting the metal with an acid. It is preferred to use less than an equivalent amount of acid because it is believed this aids in the solubilization of the remaining gel. Then a method is used to increase the metal to anion ratio of the above product. The lowest amount of anion that maintains the hydrosol is preferred since excess halide may lead to corrosion. A preferred method of increasing the metal to anion ratio is the oxidation of the above reaction product. Dialysis (e.g. aqueous dialysis through a semipermeable membrane) can also be used to increase the metal to halide ratio and will increase the ratio above what can be achieved with oxidation. The reaction is empirically illustrated using alumimum as

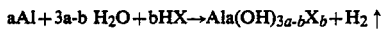

$$aAl + 3a\text{-}b\ H_2O + bHX \rightarrow Al_a(OH)_{3a\text{-}b}X_b + H_2 \uparrow$$

These water soluble inorganic primer compositions comprise colloidal aqueous solutions of hydrated alumina (aluminum oxide hydrosols) stabilized by small amounts of halide. Typically, the ratio of a to b in the above formula is about 5/1 to about 800/1. It is preferred that a ratio for a to b of from about 8 to 1 to about 800/1 is used for adhesively bonding structures with the water soluble inorganic primer because the least amount of anion to maintain the hydrosol is desirable because excess halide may lead to corrosion. Ratios of a to b higher than about 30 to 1 may be achieved by dialysis of the solution after oxidation. The aqueous solutions of hydrated metal oxides are then applied and typically dried, for example, at about 50° C. to about 170° C. for about 15 minutes. It is believed as the water evaporates from the primer further condensation occurs to produce a polymeric film of greater molecular weight.

The thickness of this primer layer can vary effectively from about 0.15 microns ($\mu$) to about 10$\mu$. Preferably the thickness is about 0.3$\mu$ to about 1.0$\mu$. Above about 10$\mu$, the layer can be so thick as to create stress risers and to form a weak boundary layer. Below about 0.15$\mu$, the layer does not provide the properties such as crack propagation resistance at the levels typically required. In addition, it is preferable to apply the primer to the metal surface with a plurality of layers as this facilitates removal of volatiles (e.g. water) which can be more difficult to achieve from a single thick application.

The articles of this invention comprise aluminum, titanium, iron, magnesium or their alloys. By alloy is meant the article having the major metal present in greater than a 50 percent by weight (%) amount. In addition, a primed metal article can be bonded to other articles (e.g. ceramic), conventional fiber reinforced polymeric matrix composites such as an epoxy, polyimide, polyester, acrylic, urethane, cellulosic, rubber or phenolic based composite. Examples of fibers include glass, alumina, silicon carbide, graphite, amides and Kevlar TM fiber (E. I. DuPont DeNemours Co., Wilmington, Del.).

Any of the above described hydrated metal oxides or mixtures thereof can be used to prime any of the above described metal articles, the composition of the mixture having little effect except that it is preferred to use the alumina primer for aluminum (or alloys thereof) articles. Thus, for example, properties such as crack propagation are enhanced when the alumina primer is applied to aluminum or its alloys.

Typically, a surface treatment material is used prior to primer application to provide the metal surface with an adhesive receptive quality. For example, conventional surface preparation compositions for aluminum are acidic in nature such as chromic acid, phosphoric acid and sulfuric acid.

Any conventional adhesive can be used for the practice of this invention that is useful for bonding articles, particularly metal articles. For example, epoxide, polyimide, acrylic or urethane adhesives are used as these provide the properties most desired such as good strength. It is especially preferred to use epoxy or polyimide adhesives as they resist environmental stresses, are strong and are frequently chosen for aerospace applications.

Any method of bonding may be used for the practice of this invention that provides an amorphous, hydrated metal oxide coated metal article bonded to another article with an adhesive. If a plurality of metal articles are to be bonded, it is preferred to prime each metal article. It is also preferred to apply a layer of hydrated metal oxide to the metal article(s) by a solvent casting, dipping or spraying procedure. The hydrated metal oxide coated metal articles are then maintained at a temperature of about 25° C. to about 300° C. Below 25° C., the water solvent evaporation is typically too slow and above 300° C. loss of desirable metal properties or crystallization of the oxide surface may occur with an accompanying loss of mechanical strength. It is especially preferred to heat the primer coated articles to a temperature of about 100° C. to about 200° C. as the lower temperatures minimize the risk of mechanical property degradation of, for example, aluminum substrates, such as with aluminum spars which have been shot peened to induce compressive surface stresses. The application of the inorganic primer for field repair situations is also possible with the use of the lower application temperature.

It is also preferred to prepare the surface of the article prior to applying the water soluble primer. For example, the surface of aluminum articles can be prepared with an acid such as phosphoric acid by, i.e. anodization. The adhesive is then applied by conventional methods to the articles and they are joined together with the application of conventional pressures, temperatures and times appropriate for the adhesive used.

EXAMPLE 1

These wedge crack tests were performed in accordance with the American Society for Testing and Materials (A.S.T.M.) D3762 procedure. In that procedure a wedge is driven into the joint bond area a predetermined length, forming a crack between the two bonded adherends. The length of any subsequent crack propagation which occurs under temperature and humidity exposure is a measurement of the crack resistance of the bonded joint.

In a 250 cc round bottom flask equipped with a magnetic stirrer, air condenser, dropping funnel, and nitrogen inlet tube was mixed 6.75 g (0.25 mole) of −170 to +300 mesh aluminum powder with 37 g of 47% hydriodic acid (0.14 mole) diluted with 40 cc of distilled water. The mixture was heated for six hours to dissolve the aluminum powder. The colorless solution was heated to 75°–80° C. with nitrogen purging, the solution reacted with 28 g of 30% hydrogen peroxide diluted with 40 cc of distilled water added dropwise over a period of six hours. During the course of oxidation, iodine crystals collected in the air condenser. Nitrogen was bubbled through the solution after cooling for a period of sixteen hours to give a light straw yellow viscous solution. The solution was warmed to 50° C. and an additional 40 cc of distilled water was added. The solution contained some sediment which was removed by centrifuging. The resulting solution contained 9.5% solids and gave a Al/I mole ratio of 9.5/1.

2024 aluminum alloy adherends were treated with a 12% phosphoric acid solution by anodization (R.T.; 8 volts) and then a 3% solids aqueous solution of the above material was applied to the aluminum adherends using one to three coatings by solvent casting (brushed on). The applied primer was air dried 15 minutes between each coating followed by heating for 30 minutes at 180° C. after which a supported film of EA-9649 adhesive was applied to the amorphous aluminum coated aluminum adherends. A stop was placed between aluminum articles to insure a bond line thickness of about 0.127 millimeters (mm) and 1.757 kilogram per square centimeter (kg/cm$^2$) pressure was applied at 177° C. for 120 minutes. Wedge crack tests were carried out per ASTM D-3762 and the results are detailed following the next example as part of FIG. 1.

EXAMPLES 2

A similar set of test specimens (using 2-4 coats) were prepared except that after application of the inorganic primer, the coating was heated at 180° C. in a vacuum oven rather than air. Wedge crack tests were carried out per ASTM D-3762. The results are detailed in FIG. 2.

EXAMPLE 3

A set of test speciments were prepared using Titanium 6-4 (Ti-6Al-4V) Pasa Jel 107 treated adherends. The inorganic primer was applied in 2 to 4 coatings of a 3% solids water solution of the hydrated aluminum oxide prepared as described in Example 1. The applied primer was dried by heating in air at 180° C. for 30 minutes after application. The results are detailed in FIG. 3.

Figure 3:
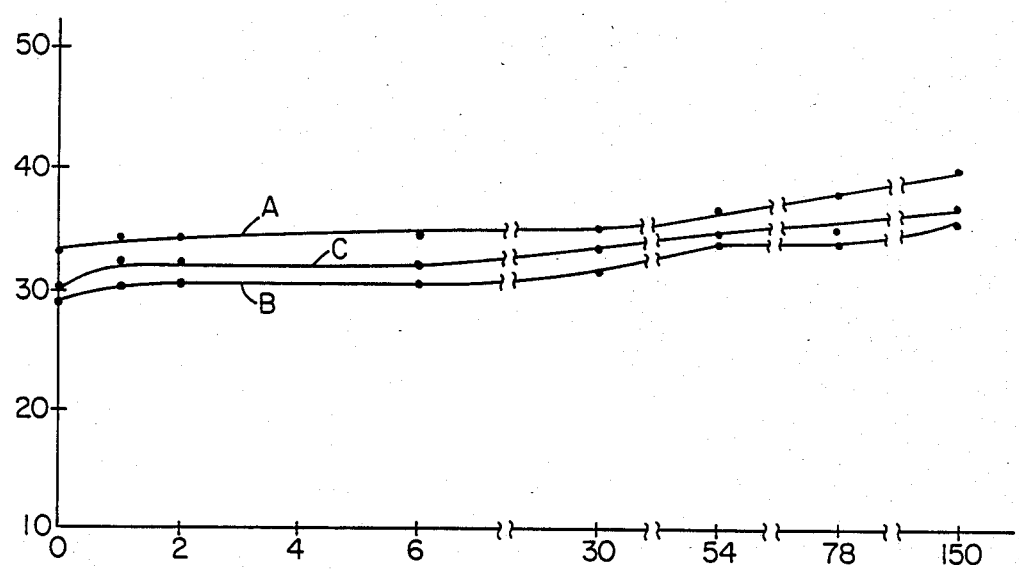
FIG. 3 illustrates crack propagation for amorphous hydrated alumina primed titanium adherend adhesive bonds having 2-4 coatings of the amorphous alumina primer.

These adhesively bonded aluminum joints are particularly resistant to crack propagation. A clear understanding of this may be had by reference to the Figures. FIGS. 1 through 3 detail data about various wedge crack tests in which wedge crack test ASTM D3762, described above, was used.

In FIG. 1 crack propagation in mm (Y) is illustrated as a function of time (X) at 71° C. and 95% R.H.. In this experiment, a PAA treatment and EA-9649 TM epoxy adhesive was used. The graphs illustrate the crack propagation as the number of coatings was increased from 1-3 corresponding to curves A-C.

FIG. 2 illustrates crack propagation in mm (Y) as a function of time (X) at 71° C. and 95% R.H. In this experiment a PAA Treatment and EA-9649 TM was used. However, the primer coating was heated at 180° C. in a vacuum oven rather than air. The graphs illustrate the crack propagation as the number of coatings was increased from 2-4 corresponding to curves A-C.

FIG. 3 illustrates crack propagation in mm Y as a function of time X at 71° C. and 95% R.H. In this experiment a Pasa Jel 107 etch and EA-9649 adhesive was used on Titanium 6-4. The graphs illustrate the crack propagation as the number of coatings was increased from 2-4 corresponding to curves A-C.

This primer may be used to advantage in bonding metal to metal or metal to composites. In addition, it may be applied to articles to aid in adhesion of coatings such as with plastic packaged microelectronic devices, wire coatings, honeycomb construction, or even reinforcing composite fibers, as in commonly assigned U.S. Pat. No. 4,678,820. While this invention has been described in terms of a hydrated metal oxide a mixture of various hydrated metal oxides can be used.

This primer coating provides improved crack propagation resistance in moist environments. The resulting properties such as tensile and T-peel strengths of bonded joints made with the inorganic primer are at least equivalent to bonded joints made using conventional organic primers. Yet the inorganic primers can be utilized at thinner layers than the 5 to 10$\mu$ layers typical of organic primers. Thicker layers tend to set up stress rises (i.e. weak boundary layer) as the components segregate. Also, because of its thermal stability the inorganic primer can be used equally as well with high temperature adhesives such as polyimides or with low temperature adhesives such as epoxy systems, unlike organic primers which are typically temperature specific. Another major advantage of the inorganic primer is that it can be used on metal surfaces which have been treated by a variety of surface treatments and provide the same high level of crack propagation resistance. In contrast, organic primers produce different results dependent upon the surface pretreatments employed. In addition, conventional organic primers use strontium chromates as corrosion inhibitors and these cause toxicity problems in their manufacture and use. This invention provides a water borne hydrated metal oxide primer for adhesively bonded joints that results in greatly increased crack propagation resistance. Thus, it makes a significant advance in the aerospace industry by providing new technology relating to adhesively bonded joints.

It should be understood that the invention is not limited to the particular embodiments shown and described herein, but that various changes and modifications may be made without departing from the spirit and scope of this novel concept as defined by the following claims.

We claim:

1. A method of bonding a plurality of articles together at least one of which is metal by placing a polymeric adhesive in contact with and between the articles and applying pressure, and optionally heat, to said articles wherein the improvement comprises:
    (a) reacting aluminum, titanium, silicon, iron or zirconium with HBr or HI;
    (b) oxidizing the reaction product with a water soluble oxidizing agent to form a hydrosol and reduce the anion concentration; and
    (c) applying said hydrosol to a surface of at least one of the metal articles prior to applying adhesive on the surface.

2. The method as recited in claim 1 wherein the metal articles comprise aluminum, titanium, magnesium or their alloys.

3. The method as recited in claim 1 wherein said oxidized reaction product is dialyzed.

* * * * *